United States Patent
Suh et al.

(10) Patent No.: US 8,704,874 B2
(45) Date of Patent: Apr. 22, 2014

(54) 3D CAPTION SIGNAL TRANSMISSION METHOD AND 3D CAPTION DISPLAY METHOD

(75) Inventors: Jong-Yeul Suh, Seoul (KR); Kyung-Ho Kim, Seoul (KR); Jin-Pil Kim, Seoul (KR); Joon-Hui Lee, Seoul (KR); Jae-Hyung Song, Seoul (KR); Ho-Taek Hong, Seoul (KR)

(73) Assignee: LG Electronics Inc. (KR)

( * ) Notice: Subject to any disclaimer, the term of this patent is extended or adjusted under 35 U.S.C. 154(b) by 234 days.

(21) Appl. No.: 13/143,556

(22) PCT Filed: Sep. 23, 2009

(86) PCT No.: PCT/KR2009/005436
§ 371 (c)(1),
(2), (4) Date: Jul. 7, 2011

(87) PCT Pub. No.: WO2010/079880
PCT Pub. Date: Jul. 15, 2010

(65) Prior Publication Data
US 2011/0279644 A1    Nov. 17, 2011

Related U.S. Application Data

(60) Provisional application No. 61/143,166, filed on Jan. 8, 2009.

(51) Int. Cl.
*H04N 13/00* (2006.01)
*H04N 13/04* (2006.01)

(52) U.S. Cl.
USPC ................................. 348/43; 348/51

(58) Field of Classification Search
None
See application file for complete search history.

(56) References Cited

U.S. PATENT DOCUMENTS

| 6,351,280 | B1 | 2/2002 | Benton |
| 2005/0248561 | A1* | 11/2005 | Ito et al. ................. 345/419 |
| 2007/0097262 | A1 | 5/2007 | Kwon et al. |
| 2007/0118399 | A1* | 5/2007 | Avinash et al. ............. 705/2 |

FOREIGN PATENT DOCUMENTS

| CN | 1960451 A | 5/2007 |
| CN | 101124572 A | 2/2008 |
| JP | 2008-515048 A | 5/2008 |
| KR | 10-2003-0019559 | 3/2003 |
| WO | 2008/115222 A1 | 9/2008 |

* cited by examiner

*Primary Examiner* — Sath V Perungavoor
*Assistant Examiner* — Kate Luo
(74) *Attorney, Agent, or Firm* — McKenna Long & Aldridge LLP

(57) ABSTRACT

A method for transmitting a three-dimensional (3D) caption signal and caption display method are disclosed to three-dimensionally display caption text such that it fits a 3D image in a 3D display device. 3D caption box configuration information and caption text are generated to display a 3D caption within a 3D image, and the 3D caption box configuration information and the caption text are inserted into a video picture header region to code the image signal, and then, the image signal is transmitted. In the caption display method, a broadcast signal including a 3D image signal is received, and 3D caption box configuration information and caption text included in the broadcast signal are acquired. A caption image including 3D caption text disposed within a 3D caption box is then generated based on the 3D caption box configuration information and the caption text, and displayed.

11 Claims, 11 Drawing Sheets

| Syntax | No. of bits | Format |
|---|---|---|
| cc_data ( ) { | | |
| reserved | 1 | '1' |
| process_cc_data_flag | 1 | bslbf |
| zero_bit | 1 | '0' |
| cc_count | 5 | uimsbf |
| reserved | 8 | '1111 1111' |
| for (i=0; i < cc_count; i++) { | | |
| one_bit | 1 | '1' |
| reserved | 4 | '1111' |
| cc_valid | 1 | bslbf |
| cc_type | 2 | bslbf |
| cc_data_1 | 8 | bslbf |
| cc_data_2 | 8 | bslbf |
| } | | |
| } | | |

| b7 | b6 | b5 | b4 | b3 | b2 | b1 | b0 |
|---|---|---|---|---|---|---|---|
| SEQ. NO. | | PACKET SIZE | | | | | |
| CAPTION CHANNEL DATA (byte 1) | | | | | | | |
| CAPTION CHANNEL DATA (byte 2) | | | | | | | |
| ⋮ | | | | | | | |
| CAPTION CHANNEL DATA (byte n-1) | | | | | | | |

Fig. 8

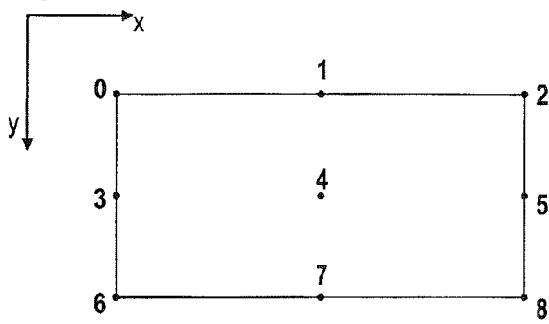

Fig. 9

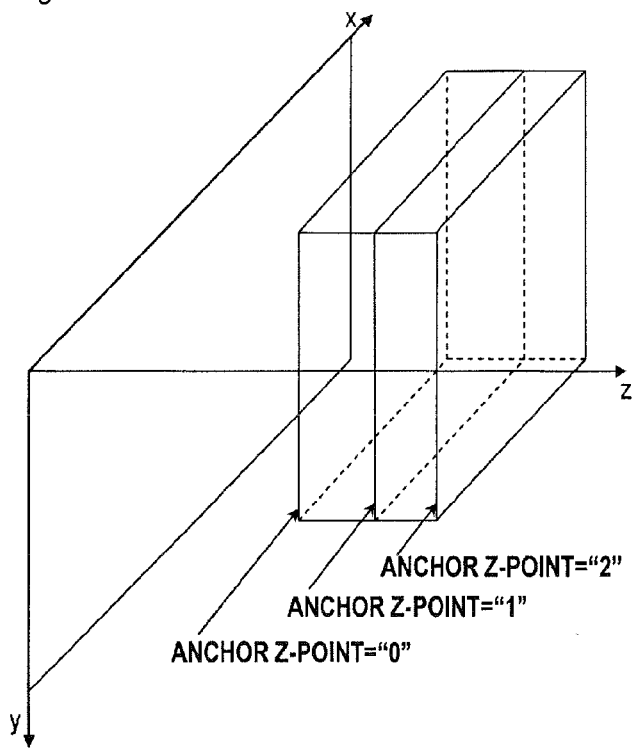

ANCHOR Z-POINT="2"
ANCHOR Z-POINT="1"
ANCHOR Z-POINT="0"

Fig. 10

| b7 | b6 | b5 | b4 | b3 | b2 | b1 | b0 | |
|---|---|---|---|---|---|---|---|---|
| 1 | 0 | 0 | 1 | 1 | \multicolumn{3}{c}{window ID} | *command* |
| 0 | 0 | v | rl | cl | \multicolumn{3}{c}{priority} | *param1* |
| rp | \multicolumn{7}{c}{anchor vertical} | *param2* |
| \multicolumn{8}{c}{anchor horizontal} | *param3* |
| \multicolumn{4}{c}{anchor point} | \multicolumn{4}{c}{row count} | *param4* |
| 0 | 0 | \multicolumn{6}{c}{column count} | *param5* |
| 0 | 0 | \multicolumn{3}{c}{window style ID} | \multicolumn{3}{c}{pen style ID} | *param6* |

Fig. 11

| b7 | b6 | b5 | b4 | b3 | b2 | b1 | b0 | |
|---|---|---|---|---|---|---|---|---|
| colspan=8: D3B (Define 3D Box Command) | | | | | | | | command |
| 0 | 0 | 0 | colspan=3: window ID | | | colspan=2: Anchor z-ID | | param1 |
| colspan=8: Anchor z-position | | | | | | | | param2 |
| colspan=8: 3D box z-size | | | | | | | | param3 |

Fig. 12

| b7 | b6 | b5 | b4 | b3 | b2 | b1 | b0 | |
|---|---|---|---|---|---|---|---|---|
| 1 | 0 | 0 | 1 | 0 | 1 | 1 | 1 | command |
| colspan=2: fill opacity | | colspan=2: fill color (r) | | colspan=2: fill color (g) | | colspan=2: fill color (b) | | param1 |
| colspan=2: border type | | colspan=2: border color (r) | | colspan=2: border color (g) | | colspan=2: border color (b) | | param2 |
| | ww | colspan=2: print direction | | colspan=2: scroll direction | | colspan=2: justify | | param3 |
| colspan=3: effect speed | | | colspan=3: effect direction | | | colspan=2: display effect | | param4 |

Fig. 13

| b7 | b6 | b5 | b4 | b3 | b2 | b1 | b0 | |
|---|---|---|---|---|---|---|---|---|
| colspan=8: S3B (Set 3D Box Attributes Command) | | | | | | | | command |
| 0 | 0 | 0 | colspan=2: top style | | colspan=3: window ID | | | param1 |
| colspan=8: horizontal skew factor | | | | | | | | param2 |
| colspan=8: vertical skew factor | | | | | | | | param3 |
| colspan=2: side opacity | | colspan=2: side color (r) | | colspan=2: side color (g) | | colspan=2: side color (b) | | param4 |

Fig. 14

| b7 | b6 | b5 | b4 | b3 | b2 | b1 | b0 | |
|---|---|---|---|---|---|---|---|---|
| 1 | 0 | 0 | 1 | 0 | 0 | 0 | 1 | command |
| colspan=2: fg opacity | | colspan=2: fg color (r) | | colspan=2: fg color (g) | | colspan=2: fg color (b) | | param1 |
| colspan=2: bg opacity | | colspan=2: bg color (r) | | colspan=2: bg color (g) | | colspan=2: bg color (b) | | param2 |
| 0 | 0 | colspan=2: edge color (r) | | colspan=2: edge color (g) | | colspan=2: edge color (b) | | param3 |

Fig. 15

| b7 | b6 | b5 | b4 | b3 | b2 | b1 | b0 | |
|---|---|---|---|---|---|---|---|---|
| colspan=8: S3P (Set 3D Pen Color Command) | | | | | | | | command |
| colspan=2: side opacity | | colspan=2: side color (r) | | colspan=2: side color (g) | | colspan=2: side color (b) | | param1 |

Fig. 16

| b7-b4 | CL | | GL | | | | | | CR | | GR | | | | | |
|---|---|---|---|---|---|---|---|---|---|---|---|---|---|---|---|---|
| b3-b0 | 0 | 1 | 2 | 3 | 4 | 5 | 6 | 7 | 8 | 9 | A | B | C | D | E | F |
| 0 | | EXT1 | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | C0 | | G0 | | | | | | C1 | | G1 | | | | | |
| 8 | | | | | | | | | | | | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |
| 0 | | | | | | | | | S3B | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | C2 | | | | | | | | | | | | | | | |
| 7 | | | | | | | | | | | | | | | | |
| 8 | S3P | D3B | G2 | | | | | | C3 | | G3 | | | | | |
| 9 | | | | | | | | | | | | | | | | |
| A | | | | | | | | | | | | | | | | |
| B | | | | | | | | | | | | | | | | |
| C | | | | | | | | | | | | | | | | |
| D | | | | | | | | | | | | | | | | |
| E | | | | | | | | | | | | | | | | |
| F | | | | | | | | | | | | | | | | |

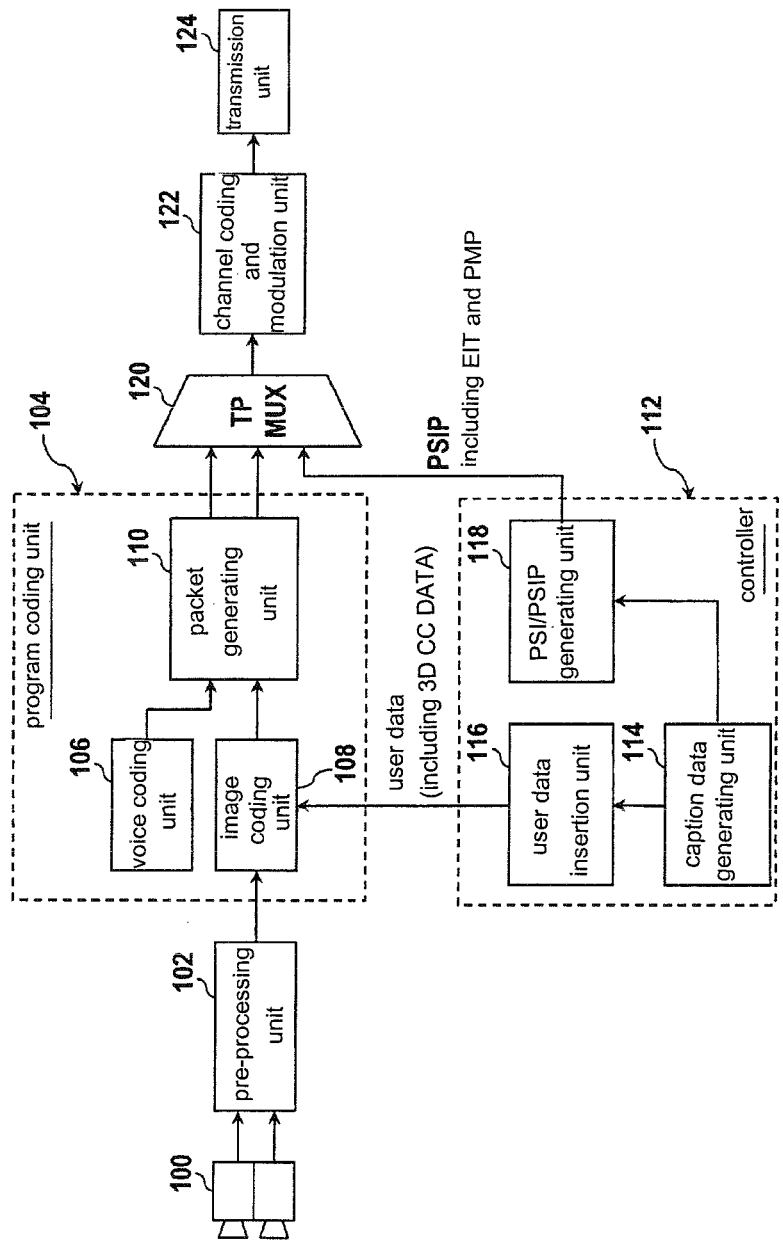

Fig. 18

| Syntax | No. of bits | Format |
|---|---|---|
| extension_and_user_data (2) { | | |
|     while ((nextbits() == extension_start_code) \|\| | | |
|     (nextbits() == user_data_start_code)) { | | |
|         if (nextbits() == extension_data_start_code) | | |
|         user_data( ) | | |
|         if (nextbits() == user_data_start_code) | | |
|         user_data( ) | | |
|     } | | |
| } | | |

| Syntax | No. of bits | Format |
|---|---|---|
| user_data( ) { | | |
|     user_data_start_code | 32 | bslbf |
|     user_data_identifier | 32 | bslbf |
|     user_structure( ) | | |
| } | | | user_data_start_code = '0x0000 01B2'
user_data_identifier = '0x4741 3934'

| Syntax | No. of bits | Format |
|---|---|---|
| ATSC_user_data( ) { | | |
|     user_data_type_code | 8 | uimsbf |
|     user_data_type_structure( ) | | |
| } | | | user_data_type_code = '0x03'

| Syntax | No. of bits | Format |
|---|---|---|
| MPEG_cc_data ( ) { | | |
|     cc_data ( ) | | |
|     marker_bits | 8 | '1111 1111' |
| } | | |

Fig. 19

| Syntax | No. of bits | Format |
|---|---|---|
| user_data_registered_itu_t_t35( ) { | | |
|     itu_t_t35_country_code | 8 | bslbf |
|     itu_t_t35_provider_code | 16 | bslbf |
|     user_identifier | 32 | bslbf |
|     user_structure( ) | | |
| } | | |

Fig. 20

| Syntax | No. of bits | Format |
|---|---|---|
| caption_service_descriptor ( ) { | | |
|     descriptor_tag | 8 | 0x86 |
|     descriptor_length | 8 | uimsbf |
|     reserved | 3 | '111' |
|     number_of_services | 5 | uimsbf |
|     for (i=0; i<number_of_services; i++) { | | |
|         language | 8*3 | uimsbf |
|         digital_cc | 1 | bslbf |
|         reserved | 1 | '1' |
|         if (digital_cc == line21) { | | |
|             reserved | 5 | '11111' |
|             line21_field | 1 | bslbf |
|         } | | |
|         else | | |
|             caption_service_number | 6 | uimsbf |
|         easy_reader | 1 | bslbf |
|         wide_aspect_ratio | 1 | bslbf |
|         reserved | 14 | '11111111111111' |
|     } | | |
| } | | |

3D CAPTION SIGNAL TRANSMISSION METHOD AND 3D CAPTION DISPLAY METHOD

This application is a National Stage Entry of International Application No. PCT/KR2009/005436, filed on Sep. 23, 2009, and claims the benefit of U.S. Provisional Application No. 61/143,166, filed Jan. 8, 2009, both of which are hereby incorporated by reference for all purposes as if fully set forth herein in their entireties.

TECHNICAL FIELD

The present invention relates to an image display method of a display device and, more particularly, to a method for displaying closed captions.

BACKGROUND ART

Closed caption broadcasting is a broadcast service for separately transmitting text data, which has not been integrated with a television image, to allow a television receiver to selectively display the text as a caption. In an NTSC standard-based analog TV broadcast, caption data is transmitted by two bytes each time as analog waveforms at the 21st line of each of first and second fields of a vertical blanking interval (VBI), so that a receiver can display the caption data on its screen. Meanwhile, in ATSC type digital television broadcasting, closed caption data may be inserted by two bytes each time as a sort of user data within an extension_and_user_data( ) structure of a picture header, and control information regarding reproduction of the closed caption may be defined in an event information table (EIT) of a PSIP (See "ATSC Digital Television Standard Part 4—MPEG-2 Video System Characteristics (A/53, Part 4:2007), with Amendment No. 1" and "Digital Television (DTV) Closed Captioning, CEA-708-B"). The receiver may interpret the caption data received through the picture header according to the CEA-708-B standard and display the closed caption according to a definition or stipulation, which was made by a transmitter side, while accumulating the pair of bytes of the caption data.

A DTV closed caption (DTVCC) in conformity with the CEA-708-B standard will now be described briefly with reference to FIGS. 1 to 5.

DTVCC data is transmitted according to a particular type of data communication protocol. FIG. 1 shows a protocol stack of the DTVCC. The protocol stack includes five layers, namely, a transport layer, a packet layer, a service layer, a coding layer, and an interpretation layer.

The transport layer is a part in which the DTVCC data is inserted to a DTV video sub-system and extracted by the receiver, which follows the definition of the ATSC A/53 standard and ISO/IEC 13818. In detail, the DTVCC data is divided by two bytes each time and transmitted through picture user data of a DTV stream, and a descriptor for signaling is transmitted through a PMP and/or the EIT of the PSIP.

FIG. 2 illustrates a syntax of the closed caption data cc_data( ) transmitted through the picture user data. "process_ cc_data_flag" is a flag indicating whether closed caption data cc_data( ) needs to be processed. That is, if the flag is set as '1', the closed caption data should be parsed and processed, whereas if the flag is set as '0', the closed caption data may be disregarded. "cc_count" field indicates the number of subsequent caption data structures and may have a value from 0 to 31. With respect to a certain number of caption data structures of the cc_count, 16-bit caption data is transmitted through a pair of "cc_data_1" and "cc_data_2" fields.

When a "cc_valid" field is set as 1, it indicates that a subsequent 2-byte caption pair is valid, and when the "cc_valid" field is set as 0, it indicates that the subsequent 2-byte caption pair is invalid. A "cc_type" field indicates, for example, a type of the subsequent two-byte caption data a defined in the CEA-708-B standard. For example, if the "cc_type" field has a value of 10, it indicates that the 2-byte closed caption data is closed caption data, and if the "cc_type" field has a value of 11, it indicates a start of new closed caption data.

With reference back to FIG. 1, before the DTVCC data is coded in the transport layer, it is packetized into a caption channel according to a certain rule. The packet layer is defined by the caption channel packet. FIG. 3 shows the structure of the caption channel packet. An n-byte caption channel packet includes a 1-byte packet header and (n−1)-byte packet header. A caption header includes a sequence number and packet size data. The sequence number is 3-byte data determined by being circulated within the range of 0 to 3 in order to determine whether or not a packet has been lost.

The DTVCC caption channel may be divided into sets of logical sub-channels called a "service". Service data is inserted into a caption channel data stream according to a time division multiplexing scheme. The service layer defines a header with respect to the number of closed caption data channel services, a service type, a service attribute, and the like. Six standard services and maximum 57 extended services can be added to the caption channel data stream, so a total 63 services can be provided. FIG. 4 shows the structure of a service block with respect to each service. A service block includes a service block header and service block data. The service block header includes a service number and service block size data. If the number of services is 6 or smaller, the service block header has one byte, while if the number of services exceeds 6, the service block header has two bytes.

With reference back to FIG. 1, the coding layer describes how data is coded for a closed caption service. Namely, the coding layer defines allocation of code space control, a caption command, and numeric codes for caption characters and symbols. FIG. 5 shows the configuration of a code space according to the CEA-708-B standard. The code space includes two code books each having 256 positions, which are divided into four code groups: CL, GL, CR, and GR. The CL group includes 32 codes from 00h to 1Fh, to which a C0 code set (various control codes), and a C2 code set (various extended control codes) are mapped. The GL group includes 96 codes from 20h to 7Fh, to which a G0 code set (a character set) and a G2 code set (extended control code 1) are mapped. The CR group includes 32 codes from 80h to 9Fh, to which a C1 code set (caption control code) and a C3 code set (extended control code 2) are mapped. The GR group includes 96 codes from A0h to FFh, to which a G1 code set (Latin characters) and a G3 code set (characters to be used in the future/icon extended set) are mapped.

Basic codes of the four code groups (CL, GL, CR, and GR) are characters, control codes, and commands of C0, C1, G0 and G1 code sets at an upper portion in FIG. 5. C2, C3, G2, and G3 code sets at a lower portion in FIG. 5 are approached by using an 'EXT1' code (10h) of the C0 code set. Namely, by adding the 'EXT1' code in front of a code or a symbol within a code space, extended C2, C3, G2, and G3 code sets can be referred to. In other words, in order to refer to the characters present in the C2, C3, G2, and G3 code sets, two bytes (i.e., 'EXT1'+basic code) must be used.

The interpretation layer defines how caption data is encoded by using the DTVCC graphic user interface, namely, the code sets of the coding layer, and how the caption data is interpreted when decoded. The interpretation layer handles a caption screen, window, pen, text, and display synchronization.

According to closed caption broadcasting implemented by those protocols, the lines (i.e., speech, dialog) of the players, lyrics of songs, movie lines translation, online TV guide, an emergency broadcast, and various other molecular services can be provided. Recently, as closed caption broadcasting tends to become mandatory limitedly in terms of media access rights of the hearing impaired or a comprehensive service, the closed caption broadcasting is anticipated to extend in its utilization.

Meanwhile, the advancement of television technology has reached a level of implementing a device for displaying stereoscopic images (or three-dimensional (3D) images), and in particular, a full-scale commercialization of a stereoscopic type 3D television is around the corner at the time of filing application of the present invention. In a stereoscopic 3D display system, two images are taken by using two image sensors spaced apart by about 65 millimeters like the human's eyes, which are then transmitted as broadcast signals to a receiver. Then, the receiver allows the two images to be inputted to the left and right eyes of a person (i.e., a user), thus simulating a binocular disparity to allow for a deep perception or stereoscopic view.

In this manner, when closed captions are intended to be implemented in the stereoscopic type 3D television, it is desirous for caption text to be stereoscopically styled and displayed. A scheme in which the receiver itself renders the 3D caption image based on the caption text, but real time defining 3D attributes (e.g., the thickness and cubic (solid) color of the caption text, a color and transparency of the caption text display region, etc.) with respect to a large quantity of continuously inputted caption text and 3D rendering the same may overly increase the calculation burden of the receiver. If 3D attributes to be indiscriminately applied to caption text are previously set and caption text is 3D-rendered according to the fixed 3D attributes, the calculation burden can be somewhat reduced, but the aesthetic sense of the 3D caption would be possibly greatly degraded and cause the user to become tired of it, significantly dampening the utility and charm of the closed caption.

Thus, a method for highly maintaining an aesthetic sense and charm of a caption image, while displaying a closed caption with a cubic effect so as to be consistent with (in harmony with) a 3D image displayed on a 3D television is required.

TECHNICAL GIST OF THE PRESENT INVENTION

Therefore, it is an object of the present invention to provide a method for transmitting a three-dimensional (3D) caption signal capable of displaying caption text three-dimensionally such that it is in harmony with a 3D image in a 3D display device.

It is another object of the present invention to provide a method for displaying a 3D caption capable of displaying caption text three-dimensionally such that it is in harmony with a 3D image in a 3D display device.

According to the present invention, a 2D caption window is conceptually extended into a 3D caption text box, and 3D caption text for implementing a 3D closed caption is displayed three-dimensionally in the 3D caption text box. To this end, in the present invention, a 3D caption text box parameter, a text box style parameter, and a style parameter for the 3D text are defined. In addition, the present invention proposes a method for receiving, decoding and applying a 3D caption text box parameter, a style parameter of a text box, and a style parameter of 3D text.

In detail, according to the method for transmitting a 3D caption signal, 3D caption box configuration information and caption text are generated to display a 3D caption within a 3D image, and the 3D caption box configuration information and the caption text are inserted into a video picture header region to code the image signal and transmit the same.

3D text configuration information may be added to the information, which is transmitted after being coded.

The 3D caption box configuration information is transmitted along with 2D window configuration information in consideration of compatibility with existing standards to complement the 2D window configuration information.

The 3D caption box configuration information may include 2D window defining information, 3D text box defining information supplementing the 2D window defining information, 2D window attribute configuration information, and a 3D text box attribute configuration information supplementing the 2D window attribute configuration information.

The 3D caption box configuration information may be inserted into a picture header region of a broadcast signal. Alternatively, the 3D caption box configuration information may be included in a descriptor and transmitted via N EIT or a PMT of a PSIP.

In a 3D caption display method, a broadcast signal including a 3D image signal is received, and 3D caption box configuration information and caption text included in the broadcast signal are acquired. And then, a caption image in which 3D caption text is disposed within a 3D caption box is generated based on the 3D caption box configuration information and the caption text, and then displayed. In this case, the caption image may be mixed with a 3D broadcast image so as to be displayed.

In the description of the present invention, the 3D caption box refers to a cubic space for displaying 3D caption text. The cubic space is not limited only to an accurately regular hexadron box and may have a distorted box shape with a skew applied to its side. In addition, 3D caption text may be partially protruded from a portion of an outer circumferential surface of the 3D caption box. The term 'box' may not be limitedly interpreted but should be interpreted comprehensively as having a meaning of a 'cubic space rather than a plane' no matter whether a substantial term such as 'frame', 'cubic space', 'cubic section', etc. is in used.

In a television receiver, a closed caption can be displayed with a cubic effect such that it is in harmony with a 3D image without heavily increasing the burden of calculation required for 3D rendering. Accordingly, the utility and charm of the closed caption can be considerably increased. In addition, because an existing caption signal transmission/reception method is implemented by supplementarily including a parameter, the compatibility with the existing standard can be secured.

BRIEF DESCRIPTION OF THE DRAWINGS

The present invention will become more fully understood from the detailed description given hereinbelow and the accompanying drawings, which are given by illustration only, and thus are not limitative of the present invention, and the same reference numerals will be used throughout to designate the same or like components, in the drawings:

FIG. 8 illustrates anchor point IDs in horizontal and vertical directions;

FIG. 9 illustrates anchor IDs in a z-axis direction;

FIG. 10 illustrates a coding format of a Define Window Command according to the CEA-708-B standard;

FIG. 11 illustrates an example of a coding format of Define 3D Box Command additionally introduced to complement the Define Window Command in order to implement a 3D caption text box according to an exemplary embodiment of the present invention;

FIG. 12 illustrates a coding format of a Set Window Attributes Command according to the CEA-708-B standard;

FIG. 13 illustrates an example of a coding format of a Set 3D Box Attributes Command additionally introduced to complement the Set Window Attributes Command to implement a 3D caption text box according to an exemplary embodiment of the present invention;

FIG. 14 illustrates a coding format of a Set Pen Color Command according to the CEA-708-B standard;

FIG. 15 illustrates a coding format of a Set 3D Pen Color Command additionally introduced to complement the Set Pen Color Command to implement 3D text according to an exemplary embodiment of the present invention;

FIG. 16 illustrates the locations of the Define 3D Box Command, the Set 3D Box Attributes Command, and the Set 3D Pen Color Command in the code space according to an exemplary embodiment of the present invention;

FIG. 17 is a schematic block diagram of a broadcast transmission system according to an exemplary embodiment of the present invention;

FIG. 18 illustrates the syntax of a user data bit stream for transmitting closed caption data in the system of FIG. 17;

FIG. 19 illustrates the syntax of an SEI RBSP Payload bit stream suitable for transmitting closed caption data in a modification in which a pair of stereoscopic images are coded according to H.264/AVC standard;

FIG. 20 illustrates the syntax of a caption service descriptor included in an event information table (EIT);

MODE FOR CARRYING OUT THE PREFERRED EMBODIMENTS

Before describing the exemplary embodiments of the present invention, the concept and definition of terms and parameters used in the present invention in relation to 3D caption will now be first explained.

As mentioned above, 2D closed caption is displayed based on a window according to the CEA-708-B standard constituting a portion of the ATSC digital television standard. In the present invention, a window in conformity with the CEA-708-B standard is conceptually extended into a 3D caption text box by applying an additional reference axis (i.e., z axis) extending in a direction perpendicular to the screen plane of a display. Accordingly, in the present invention 3D caption text for implementing a 3D closed caption is three-dimensionally displayed within a 3D caption text box.

Figure 6:
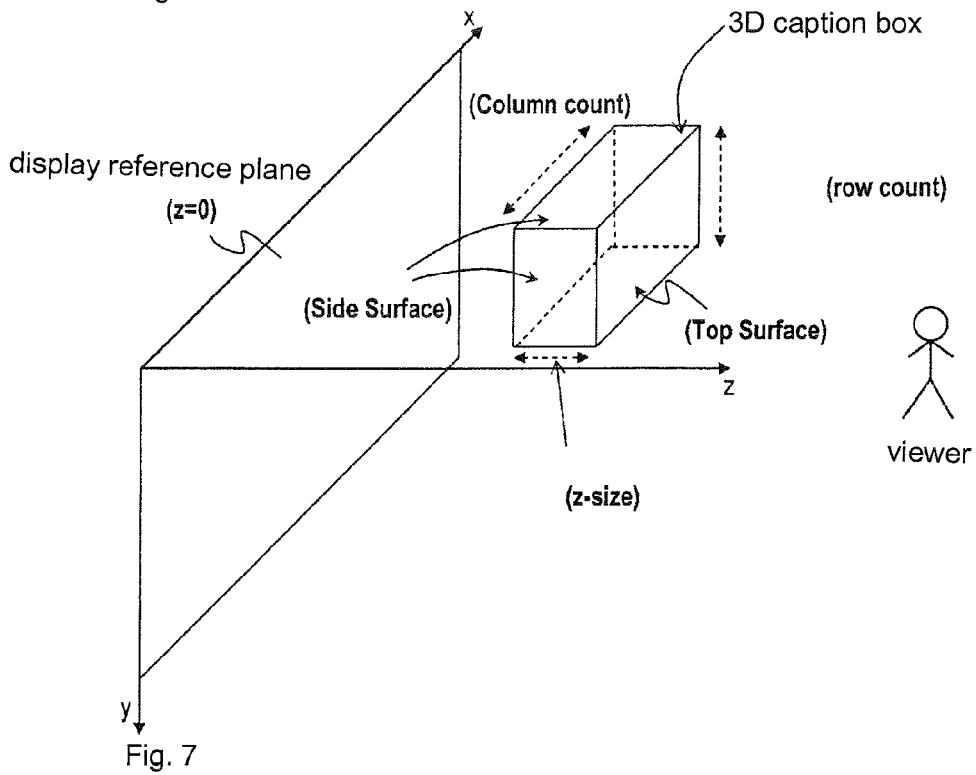
FIG. 6 illustrates a coordinate system showing the location and size of a 3D caption text box for implementing a 3D closed caption according to an exemplary embodiment of the present invention.

FIG. 6 illustrates a coordinate system showing the location and size of a 3D caption text box for implementing a 3D closed caption according to an exemplary embodiment of the present invention.

In an exemplary embodiment of the present invention, respective points are expressed by rectangular coordinates within the space in front of the display reference plane. The display reference plane may be a virtual plane serving as a reference in displaying a 3D image. However the screen plane of the display device may be the display reference plane. In displaying a location by the rectangular coordinates, the origin may be a point on an upper corner of a left side of the display reference plane or on the display reference plane. Here, x axis extends to the right when a viewer looks at the screen, y axis extends downward, and z axis extends forward. It should be noted that this coordinates system is different from the general geometrical rectangular coordinates in the coordinate axes directions.

A horizontal width of the 3D caption text box is indicated as a column count, the height of the 3D caption text box is indicated as a row count, and the thickness in the forward/backward direction is indicated as a z-size.

The plane of the 3D caption text box that points toward the viewer, namely, the plane in the z axis direction, will be called a top surface, and the up/down and left/right planes in contact with the top surface will be called a side surface.

Figure 7:
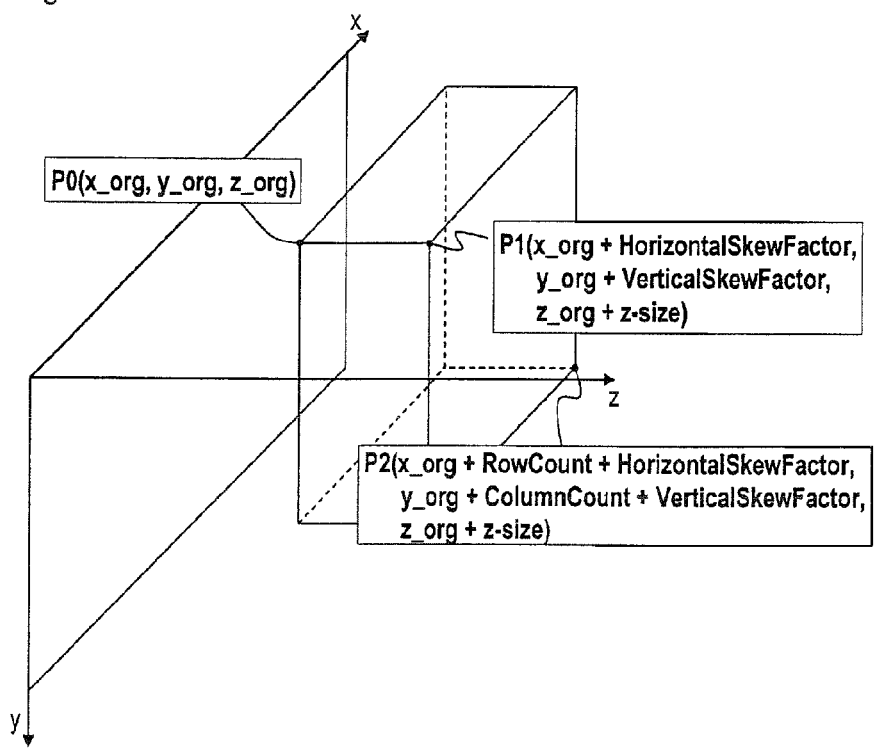
FIG. 7 illustrates relative coordinates between vortexes of the 3D caption text box.

FIG. 7 illustrates relative coordinates between vortexes of the 3D caption text box. When coordinates of the vortex P0 at the upper corner of the left rear side of the 3D caption text box are (x_org, y_org, and z_org), the coordinates of the vortex P1 at a front side of the point P0 is (x_org+HorizontalSkewFactor, y_org+VerticalSkewFactor, z_org+z-size), and the coordinates of the vortex P2 located in a diagonal direction of the point P0 is (x_org+RowCount+HorizontalSkewFactor, y_org+ColumnCount+VerticalSkewFactor, z_org+z-size).

According to the CEA-708-B standard, up to eight caption windows may exist to display caption text for each service. In an exemplary embodiment of the present invention, the 3D caption text box for displaying 3D caption text is defined by spatially extending the window, so like the existing caption windows, up to eight windows may exist for each service. In an exemplary embodiment of the present invention including the claim coverage, "window" in a context related to a 3D caption should be interpreted to have the same meaning as a "3D caption text box" and a "Window ID" should be interpreted to have the same meaning as "3D caption box ID".

Meanwhile, according to the CEA-708-B constituting a portion of the ATSC digital television standard, anchor points can be defined as reference points of shrinking and growing (i.e., reduction of expansion) of a window in designating the location of each window on the screen and changing a font size. The anchor points may be displayed by anchor point IDs. FIG. 8 shows anchor point IDs in conformity with the CEA-708-B standard. For example, the anchor 0 indicates a vertex of the left upper end of the window, and anchor 8 indicates the vortex of the left lower end of the window. In an exemplary embodiment of the present invention, in defining a signaling structure of a 3D caption and its related system, the anchor ID in the z-axis direction is additionally defined while maintaining the existing anchor point defining scheme according to the CEA-708-B standard as described above is maintained in the vertical and horizontal directions, in order to maximize compatibility with the ATSC digital television standard. FIG. 9 shows anchor IDs in the z-axis direction. As shown, regarding the points present on the bottom facing the upper plane of the 3D caption text box, an anchor ID (ANCHOR Z-POINT) in the z-axis direction is set as 0, regarding the points present on the plane being parallel to the bottom surface and the top surface and bisecting the 3D caption text box, the anchor ID (ANCHOR Z-POINT) in the x-axis direction is set as 1, and regarding the points present on the top surface of the 3D caption text box, the anchor ID (ANCHOR Z-POINT) in the z-axis direction is set as 2. Accordingly, in the exemplary embodiment of the present invention, the anchor points may be discerned by the two anchor IDs, namely, the planar anchor ID as shown in FIG. 8 and the z-axis directional anchor ID as shown in FIG. 9.

Generation and Interpretation of Commands

In order to smoothly display caption text based on window, the CEA-708-B standard allows for defining of window by the Define Window Command and defines the attributes such as color or the like of the window by a Set Window Attributes Command. In addition, the standard allows for defining a font size and font attribute by a Set Pen Attributes Command.

In an exemplary embodiment of the present invention, in defining the transmission side to define a 3D caption text box, only minimum additional information is provided to the window defined by the Define Window Command to minimize the amount of information to be transmitted while maximizing the compatibility with the existing standard. In detail, in an exemplary embodiment of the present invention, an additional parameter is provided through a Define 3D Box Command, in addition to the Define Window Command, to allow for defining of the 3D caption text box. In addition, in an exemplary embodiment of the present invention, an additional parameter is provided through a Set 3D Box Attributes Command, in addition to the Set Window Attributes Command, to allow for setting the attributes of the 3D caption text box. In addition, in an exemplary embodiment of the present invention, an additional parameter is provided through a Set 3D Pen Color Command, in addition to the Set Pen Attributes Command, to allow for setting of cubical attributes of 3D text.

FIG. 10 illustrates a coding format of the Define Window Command according to the CEA-708-B standard. The Define Window Command includes a total of 7 bytes including 1 byte-command code and 6-byte parameter. A "window ID" field indicates a window identifier, having values from 0 to 7. In the coding format illustrated in FIG. 10, the first byte command code has a value of '0x98' to '0x9F' according to the value of the "window ID" field, and is simply called as DF0 (Define Window 0) to DF7 (Define Window 7) in the code space.

A "priority" field indicates display priority of window, having values from 0 to 7. The priority is higher as the number is small, and a window having a higher priority level is displayed in an overlap manner on a window having a lower priority level on the screen.

An "anchor point (ap)" field is an ID of a window anchor point used as a reference point in designing the location of the window on the screen and changing a font size.

When a "relative positioning (rp)" flag is set as 1, it indicates that coordinate values of the "anchor vertical (av)" and "anchor horizontal (ah)" fields are displayed as relative coordinates (namely, the percentage), not physical screen coordinates.

An "anchor vertical (av)" field is a vertical location of an anchor point of a window on the screen when the window is displayed.

An "anchor horizontal (ah)" field is a horizontal location of an anchor point of the window on the screen when the window is displayed.

A "row count (rc)" field is the number of text rows within the window.

A "column count (cc)" field is the number of text columns within the window.

When a "row lock (rl)" flag is set as 1, it indicates that the number of caption text rows included in the window is fixed, and when the "row lock (rl)" flag is set as 0, it indicates that the receiver is allowed to add rows within the window when the user selects a small font.

When a "column lock (cl)" flag is set as 1, it indicates that the number of caption text rows included in the window is fixed, and when "column lock (cl)" flag is set as 0, it indicates that the receiver is allowed to add columns within the window when the user selects a small font.

When a "visible (v)" flag is set as 1, it indicates that the window is to be displayed on the screen as soon as it is generated, and when the "visible (v)" flag is set as 1, it indicates that the window is not displayed immediately after the window is generated.

A "window style ID (ws)" field indicates one of seven pre-set window attribute styles to be used for the window when the window is generated.

The window attribute style may be changed by a SetWindowAttributes Command (to be described).

A "pen style ID (ps)" field indicates one of seven pre-set pen attribute styles to be used for the window when the window is generated. This pen attribute style may be changed by a SetPenAttributes Command (to be described).

FIG. 11 illustrates an example of a coding format of Define 3D Box Command additionally introduced to complement the Define Window Command of FIG. 10 in order to implement a 3D caption text box according to an exemplary embodiment of the present invention.

In the present exemplary embodiment, the Define 3D Box Command includes a total of four bytes including a 1-byte command code and a 3-byte parameter, and may be simply called 'D3B'. As described above, the Define 3D Box Command is a command language for providing 3D characteristics to a window defined by using the Define Window Command, which provides 3D anchor point ID information regarding a corresponding caption text box, z-axis directional location of anchor points, and a z-axis directional size of a 3D caption text box. The 2D characteristics defined by the Define Window Command are reflected on the characteristics of the top surface of the 3D caption text box.

An "Anchor z-ID" field indicates a z-axis directional ID of an anchor point used as a reference point of shrinking and growing (or reduction and expansion) of the 3D caption text box in designating the location of the 3D caption text box and changing a font size. The "Anchor z-ID" field, which is decoded together with an "anchor point (ap)" field in the Define Window Command, indicates a reference point of the shrinking and growing of the 3D caption text box. As shown in FIG. 9, the "Anchor z-ID" field has a value of 0, 1 or 2.

The "anchor z-position" field indicates a z coordinate of the anchor point of the 3D caption text box. This "anchor z-position" field is decoded together with the "anchor vertical (av)" and the "anchor horizontal (ah)" field in the Define Window Command in FIG. 10 to indicate the location of the 3D caption text box in the space of the anchor points of the 3D caption text box. In an exemplary embodiment, this field has a value ranging from −128 to 127, and the size of the "anchor z-position" field when physically outputted in the 3D display is calculated by Equation 1 shown below:

$$\text{Real Distance between 3D Box and Reference Plane} = \frac{\text{anchor } z\text{-position}}{128} \quad \text{[Equation 1]}$$

A "3D box z-size" field indicates the size of the 3D caption text box in the z-axis direction. This field indicates a 3D size of the 3D caption text box together with the "row count (rc)" and the "column count (cc)" in the Define Window Command. The value of the "3D box z-size", which is relative, has a value from 0 to 128, and by using this value, the actual size value of the actually physically rendered 3D caption text box in the z-axis direction. For example, if the size of a range of a physical depth that can be expressed by the display device (i.e., the absolute size of the physical z-size that the display unit can express) is K, the actual size of the 3D caption text box when it is outputted is calculated by Equation 2 shown below:

$$\text{Real } z\text{-size of 3D Box} = \frac{K \times 3D \text{ box } z\text{-size}}{128}$$
$$= \frac{\left(\begin{array}{c}\text{maximum depth value} - \\ \text{minimum depth value}\end{array}\right) \times 3D \text{ box } z\text{-size}}{128}$$

[Equation 2]

FIG. 12 illustrates a coding format of a Set Window Attributes Command according to the CEA-708-B standard. The Set Window Attribute Command includes a total of 5 bytes including a 1-byte command code and four-byte parameter. The command code of the first byte has a value of '0x18' and simply called as SWA in the code space.

A "justify" field states a sorting form (left sorting, middle sorting, right sorting, both-side sorting) of text to be written in the window.

A "print direction" field states in which direction text should be written within the window.

A "scroll direction" field states in which direction text should be scrolled when the end of a caption line is reached.

When a "wordwrap (ww)" field is set as 1, it indicates that a word transfer is enabled, and when it is set as 0, it indicates that the word transfer is disabled.

A "display effect" field states the effect generated when a window is displayed or concealed, having a value of 0, 1 or 2. When this field is set as 0, a SNAP effect is achieved such that, if the window is concealed, it disappears, and then, when the window is displayed, it is popped up. When this field is set as 1, a FADE effect is achieved such that the window disappears and then appears at a speed determined by an "effect speed" field (to be described). When this field is set as 2, a WIPE effect is achieved such that the window is deleted and then appears at the speed determined by the "effect speed" field in a direction determined by an "effect direction (ed)" field.

The "effect direction (ed)" field has a value ranging from 0 to 3, and indicates one of directions, namely, from left to right, from right to left, from up to down, and from down to up, in which the WIPE effect is expressed.

An "effect speed" field indicates the speed, at which the FADE and the WIPE effect is expressed, by 0.5 seconds.

A "fill color (fc)" field indicates a color of the top surface of the window, namely, 3D text, and has a value ranging from 0 to 3 for each of RGB.

A "fill opacity (fo)" field indicates transparency of the window. This field has a value ranging from 0 to 3, and indicates 'Solid', 'Flash (i.e., Transparent/Solid are alternately displayed), 'Translucent', and 'Transparent' according to its value.

A "border type (bt)" field has a value ranging from 0 to 5, and indicates one of 'None', 'Raised', 'Depressed', 'Uniform', 'Shadow-Left', and 'Shadow-Right' according to its value.

A "border color (bc)" field indicates the color of a left corner of the window and has a value ranging from 0 to 3. This field may be disregarded when the window is expressed as a 3D caption text box according to an exemplary embodiment of the present invention. Meanwhile, in a modification, the "border color (bc)" field may be interpreted in place of a "side color (bc)" field (to be described).

FIG. 13 illustrates an example of a coding format of a Set 3D Box Attributes Command additionally introduced to complement the Set Window Attributes Command to implement a 3D caption text box according to an exemplary embodiment of the present invention.

In the present exemplary embodiment, the Set 3D Box Attributes Command includes a total of five bytes including 1-byte command code and a 4-byte parameter, and can be simply called "S3B". The Set 3D Box Attributes Command is a command for defining a cubic (three-dimensional) style by complementing the Set Window Attributes Command with respect to the 3D caption text box defined by using the Define Window Command and the Define 3D Box Command, and informs about a horizontal and vertical skew information of the 3D caption text box and a color and transparency with respect to the side surface.

A "top style" field designates a style of the top surface of the 3D text and may have a value corresponding to a uniform plane, rounded, etc.

A "side color" field indicates a color of the side surface of the 3D caption text box, and has a value ranging from 0 to 3 with respect to each of RGB. Thus, the "side color" field can express a total of 64 colors.

A "side opacity" field indicates transparency of the side surface of the 3D caption text box. This field has a value ranging from 0 to 3, and indicates 'Solid', 'Flash, 'Translucent', and 'Transparent' according to its value. When the "side opacity" field indicates 'Solid', 2D text is displayed on the top surface of the solid 3D caption text box and the side surface of the text is not displayed. In this case, the attributes of the top surface of the caption text box are given by the Set Window Attributes Command, and the attributes of the side surface are given by the Set 3D Box Attributes. When the "side opacity" field indicates 'Translucent', the side surface of the 3D caption text box is displayed to be translucent. The side surface of the 3D text within the 3D caption text box can be seen through the transparent surface, and in this case, the color of the side surface of characters may be filtered by the color of the transparent surface of the 3D caption text box. When the "side opacity" field indicates 'Transparent', 3D text is displayed, and in this case, the side surface of the characters is also clearly displayed. The "side opacity" field may interwork with the "fill opacity (fo)" value with respect to the top surface of the 3D text.

Meanwhile, a "horizontal skew factor" field indicates a horizontal skew, namely, a tilt value, and a "vertical skew factor" field indicates a vertical tilt value.

FIG. 14 illustrates a coding format of a Set Pen Color Command according to the CEA-708-B standard. The Set Window Attributes Command includes a total of four bytes including a 1-byte command code and 3-byte parameter. The command code of the first byte has a value of '0x91', and simply called an SPC in the code space.

A "fg color" field indicates a color of a front surface of text and has a value ranging from 0 to 3.

A "fg opacity (fo)" field indicates transparency of the front surface of the text. This field has a value ranging from 0 to 3, and indicates 'Solid', 'Flash, 'Translucent', and 'Transparent' according to its value.

A "bg color" field indicates a color of the background of the text and has a value ranging from 0 to 3.

A "bg opacity (bo)" field indicates transparency of the background of the text. This field has a value ranging from 0 to 3, and indicates 'Solid', 'Flash, 'Translucent', and 'Transparent' according to its value.

An "edge color" field indicates a color of the edge of the text and has a value ranging from 0 to 3. In an exemplary embodiment of the present invention, when text is expressed as 3D text, this field may be disregarded.

FIG. 15 illustrates a coding format of a Set 3D Pen Color Command additionally introduced to complement the Set Pen Color Command in FIG. 14 to implement 3D text according to an exemplary embodiment of the present invention. In the present exemplary embodiment, the Set 3D Pen Color Command includes a total of two bytes including a 1-byte command code and a 1-byte parameter, and may be simply called 'S3P' in the code space. The Set 3D Pen Color command defines the color of 3D text along with the Set Pen Color Command, and informs the transparency and color of the side surface of the 3D text.

A "side opacity (so)" field indicates transparency of the side surface of the 3D text. This field has a value ranging from 0 to 3 and indicates 'Solid', 'Flash, 'Translucent', and 'Transparent' according to its value.

A "side color" field indicates the color of the side surface of the 3D text and has a value ranging from 0 to 3.

FIG. 16 illustrates the locations of the Define 3D Box Command, the Set 3D Box Attributes Command, and the Set 3D Pen Color Command in the code space according to an exemplary embodiment of the present invention.

Figures 4, 5:
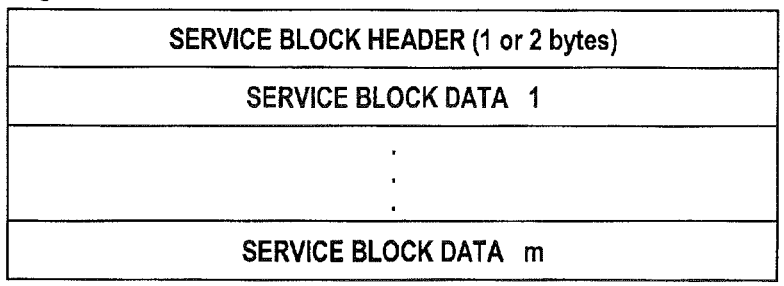
FIG. 4 shows the structure of a service block in conformity with CEA-708-B standard.
FIG. 5 shows the configuration of a code space in conformity with CEA-708-B standard.

In the code space in conformity with the CEA-708-B standard as shown in FIG. 5, a caption control code is disposed in a C1 region. If an additional command is required in addition to this code set, reserved space of the C2 region or C3 region can be used. A code set of the C2 region includes 32 codes from "0x00" to "0x1F" and may be addressed by using "0x10" (i.e., N 'EXT1' code) as a prefix. In the code set of the C2 region codes from "0x00" to "0x07" are allocated to be used as 1-byte codes (namely, there is no additional byte), codes from "0x08" to "0x0F" can be used as 2-byte codes (namely, a byte is an additional byte), codes from "0x10" to "0x17" are allocated to be used as 3-byte codes (namely, 2 bytes are additional bytes), and codes from "0x18" to "0x1F" are allocated to be used as 4-byte codes (namely, 3 bytes are additional bytes). Meanwhile, the code set of the C3 region includes 32 codes from "0x80" to "0x9F" and can be addressed by using "0x10" (i.e., 'EXT1' code) as a prefix. In the code set of the C3 region, codes from "0x80" to "0x87" are allocated to be used as 5-byte codes (namely, 4 bytes are additional bytes), codes from "0x88" to "0x8F" are allocated to be used as 6-byte codes (namely, 5 bytes are additional bytes), and codes from "0x90" to "0x9F" are allocated to be used as variable caption codes.

In the exemplary embodiment as described above, the Define 3D Box (D3B) Command includes a total of four bytes excluding the prefix, namely, the "EXT1' code, so it can be mapped to one of the codes from "0x18" to "0x1F" so as to be used. Preferably, the Define 3D Box Command is mapped to the location of "0x18" and used.

Meanwhile, the Set 3D Box Attributes (S3B) Command is a 5-byte command, so it can be mapped to one of the codes from "0x80" to "0x87" and used. Preferably, the Set 3D Attributes (S3B) Command is mapped to the location of "0x80" and used.

Meanwhile, the Set 3D Pen Color (S3P) Command is a 2-byte command, so it can be mapped to one of the codes from "0x08" to "0x0F" and used. Preferably, the Set 3D Pen Color (S3B) Command is mapped to the location of "0x08" and used.

Broadcasting System and Television Receiver

FIG. 17 is a schematic block diagram of a broadcast transmission system according to an exemplary embodiment of the present invention. The illustrated system includes a binocular camera 110, a preprocessing unit 102, a program decoding unit 104, a controller 112, a transport multiplexing unit 120, a channel coding and modulation unit 122, and a transmitter 124.

The binocular camera 100 includes two lenses and corresponding image pick-up devices, and captures a pair of two-dimensional (2D) images with respect to a front scene. Like human eyes, the two lenses and image pickup device are disposed to have a distance of 65 millimeters (mm), and accordingly, the camera 100 acquires two two-dimensional (2D) images having a binocular disparity. In the following description, among the two 2D images constituting a pair of stereoscopic images, an image acquired by the left lens will be called a left image, and an image acquired by the right lens will be called a right image.

The preprocessing unit 102 removes noise that may be present at the left original image acquired by the camera 100, corrects the image, and resolves an imbalancing phenomenon of a luminance component. The image may be stored in a storage unit or edited before or after the preprocessing performed by the preprocessing unit 102, and accordingly, there may be a considerable time difference between the image capturing by the camera 100 and coding performed by the program coding unit 104.

In the program coding unit 104, a voice coding unit 106 receives a voice signal from a plurality of microphones (not shown) installed at proper locations of an actual image capturing spot and codes the received voice signal according to a predetermined standard, e.g., an AC-3 standard, to generate an audio elementary stream (ES).

An image coding unit 108 codes the image acquired by the camera 100 according to a certain standard and compresses the coded image by removing a temporal and spatial redundancy, generate a video elementary stream (ES). The image coding unit 108 receives user data from a user data insertion unit 116, includes it in a picture header region, and codes the same. The user data includes closed caption data, and the closed caption data includes control codes for controlling displaying of caption text as well as caption text. In particular, according to an exemplary embodiment of the present invention, the control codes may include not only 2D caption control codes such as the Define Window (DFx) Command, the Set Window Attributes (SWA) Command, The Set Pen Color (SPC) Command, etc., but commands, namely, the Define 3D Box (D3B) Command, the Set 3D Box Attributes (S3B) Command, the Set 3D Pen Color (S3P) Command, etc., for implementing a 3D caption by complementing those codes.

In an exemplary embodiment, the image coding unit 108 codes an image signal according to the MPEG-2 standard of ISO/IEC 13838-2 and the ATSC digital television standard of A/53 Part 4. However, without being limited thereto, the image coding unit 108 may code an image according to an H.264/AVC standard drafted by ISO/IEC JTC1/SC29/WG11 and Joint Video Team (JVT) of ITU-T SG16 Q.6 or other schemes.

A packet generating unit 110 receives the audio ES and the video ES from the voice coding unit 106 and the image coding unit 108, respectively, and packetizes the respective streams to generate a packetized elementary stream (PES).

The controller 112 includes a caption data generating unit 114, a user data insertion unit 116, and a PSI/PSIP generating unit 118. The controller 112 controls a general operation of the system, and generates user data, program specification information (PSI), and program and system information protocol (PSIP) data required for coding an image signal.

Figures 1, 2, 3:
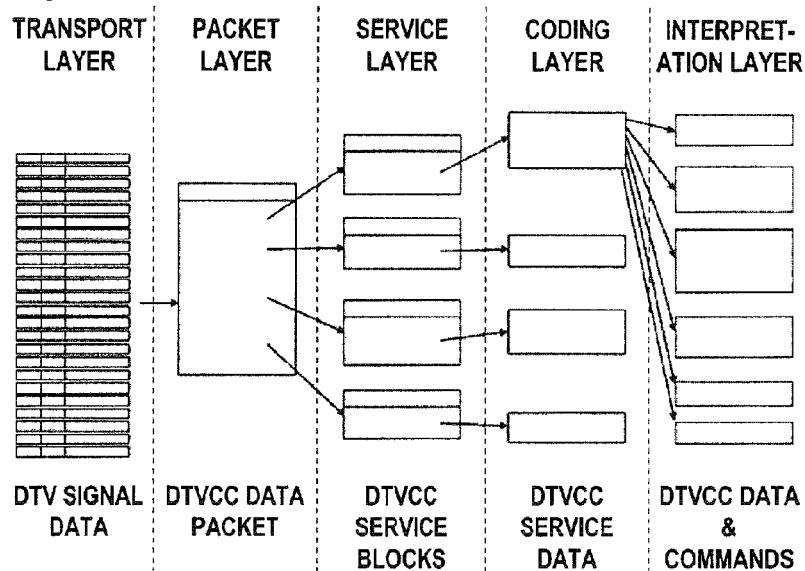
FIG. 1 illustrates a protocol stack of a digital television (DTV) closed caption (DTVCC) in conformity with CEA-708-B standard.
FIG. 2 illustrates the syntax of closed caption data cc_data( ) transmitted through picture user data according to ATSC A/53 standard.
FIG. 3 shows the structure of a caption channel packet in conformity with CEA-708-B standard.

The caption data generating unit 114 receives time-coded caption data through a network or a recording medium from an external work station, packetizes the received data into a caption channel packet as shown in FIG. 3, and outputs the same. Also, the caption data generating unit 114 generates caption service information to be used for generating a caption service descriptor.

The user data insertion unit 116 provides extended data and user data, which are to be inserted at a sequence level, a GOP level, or a picture level in coding an image signal by the image coding unit 108, to the image coding unit 108. In particular, the user data insertion unit 116 provides a caption channel packet from the caption data generating unit 114, as a sort of user data, to the image coding unit 108, so that the image coding unit 108 can code the image signal by including the caption channel packet in the picture header. In transmitting the left and right images to implement a stereoscopic 3D image, one of the two images may be designated as a base view and the other remaining one may be designated as an extended view, and preferably, the caption channel packet is generated based on the base view and transmitted.

The PSI/PSIP generating unit 118 generates program specification information (PSI) and program and system information protocol (PSIP) data. A caption service descriptor for describing caption service information is included in a program mapping table (PMT) or in an event information table (EIT) within the PSIP. The caption service descriptor, a descriptor for providing signaling information regarding a closed caption, provides information such as a type of a closed caption (namely, an NTSC type line-21 closed caption service or a digital TV closed caption service), a caption language, and the like, to the receiver.

The transport multiplexing unit 120 multiplexes the PES and the PSI/PSIP information and adds a header to generate a transport stream (ST). Meanwhile, the system of FIG. 1 transmits a single channel via a ground wave, but a system, which transmits a broadcast signal via, for example, a cable network or a satellite network, may additionally have a transmission multiplexer for multiplexing broadcast signals of multiple channels to generate a multi-program TS. The channel coding and modulation unit 122 performs error-correction coding on the TS so that a receiver can detect an error that may be caused by noise in a transport channel, and correct it. In addition, the channel coding and modulation unit 122 modulates the error-correction-coded TS according to a modulation scheme, e.g., an 8-VSB modulation scheme, adopted by the system. The transmission unit 124 transmits the modulated broadcast signal according to channel characteristics, e.g., via an antenna.

The structure of signal data by which the system of FIG. 17 transmits closed caption information will now be described in detail with reference to FIGS. 18 and 19.

According to the MPEG-2 standard of ISO/IEC 13838-2 and ATSC digital television standard of A/53 Part 4, an extension_and_user_data( ) structure for defining extended data or user data may be inserted to a header at a video sequence, GOP or picture level. Preferably, the closed caption data is included as user data (i.e., picture user data) within extension_and_user_data( ) that can be disposed following a picture header at the picture level, namely, in the video ES, and transmitted.

A first table in FIG. 18 shows the syntax of a picture extension and user data. '2' in the parenthesis of extension_and_user_data(2) corresponding to a syntax title indicates that this syntax is at the picture level. As shown in the execution conditions of 'do while' sentence, bits appearing next within the picture header are extension_start_code or user_data_start_code, the following bit streams have the extension_and_user_data(2) structure. Accordingly, the receiver recognizes the bit streams following the extension_start_code or the user_data_start_code, as extension_data(2) or user data( ).

As shown in a second table in FIG. 18, picture user data (user_data( ) includes "user_data_start_code" and "user_data_identifier" fields, and these fields are followed by user_structure( ). The value of "user_data_start_code" is determined as '0x0000 01B2' according to the ISO/IEC 13818-2 standard. The "user_data_identifier" field is a 32-bit code indicating the syntax and meaning of user_structure( ) which is determined as a value of "format_identifier" according to a definition of the ISO/IEC 13838-1 standard, and in the case of ATSC_user_data( ) as in the present invention, it is determined as a value of '0x4741 3934'.

The user_structure( ) is a variable data structure defined by the "user_data_identifier" field and includes "user_data_type_code" and user_data_type_structure( ) as shown in a third table in FIG. 7. "user_data_type_code" is a 8-bit value indicating a type of ATSC user data. When the "user_data_type_code" has a value of '0x03', it indicates closed caption data. The syntax of the closed caption data cc_data is as shown in FIG. 2.

In this manner, according to an exemplary embodiment of the present invention, two 2D images constituting a pair of stereoscopic images are coded according to the MPEG-2 standard, and the closed caption data is included as user data in the picture header of the video ES. In this case, however, the image may be coded according to any other coding schemes, for example, an H.265/AVC standard drafted by the ISO/IEC JTC1/SC29/WG11 and Joint Video Team (JVT) of ITU-T SG16. When an image is coded according to the H.264/AVC standard, closed caption data may be included in a supplemental enhancement information (SEI) region and transmitted.

FIG. 19 illustrates the syntax of an SEI RBSP payload bit stream suitable for transmitting closed caption data in a modification in which a pair of stereoscopic images are coded according to the H.265/AVC standard.

In the syntax as shown in FIG. 19, "itu_t_t35_country_code" is a 8-bit country code defined in an Annex A of an ITU-T T35, and "itu_t_t35_country_code" of Korea has a value of '0x61'. The "itu_t_t35_country_code" is a 16-bit code having a value of '0x0031'. "user_identifier" is a 32-bit code, which may indicate that the syntax structure of user_structure is defined by ATSC A/53 by using a value of '0x4741 3934'. In this case, the user_structure( ) may be used in the same manner as that defined in the ATSC digital television standard, namely, an A/53 Part 4 Section 6.2.3. Thus, closed caption data can be displayed by using the user data syntax in the third table in FIG. 18 and the closed caption syntax of FIG. 2.

Meanwhile, caption service information describing a type and an attribute of a caption service transmitted after being coded within picture user data is transmitted to the receiver, separately from caption data. In the present exemplary embodiment, the caption service information is generated according to the ATSC A/65 standard, included in a caption service descriptor, and transmitted via an event information table (EIT) of an MPEG-2 transport stream.

FIG. 20 illustrates the syntax of bit stream of a caption service descriptor included in the EIT according to the present exemplary embodiment. In general, the caption service descriptor is a descriptor for providing signaling information regarding a closed caption, which is used for transmitting information such as a type of a closed caption (namely, an NTSC type line-21 closed caption service or a digital TV closed caption service), a caption language, and the like.

A "descriptor_tag" field is an 8-bit field indicating a type of a descriptor, which has a value of '0x86' in case of a caption service descriptor. A "descriptor_length" field is a count value indicating the number of bytes following this field within a descriptor. A "number_of_services" field is a 5-bit integer within a range from 1 to 16 indicating the number of closed caption services present in an EIT event.

Each of the processes repeated within a 'for' loop defines a single closed caption service existing as a single sub-stream within a closed caption stream of 9600 bps. Each repeated process provides the language, attribute, and relevant caption service number of a service. A "language" field is a 3-byte language code indicating the language regarding a closed caption service, having a 3-character code value according to an ISO 639.2/B standard. When "digital_cc" field is clear, the "language" field does not have any meaning. When the "digital_cc" field is set as 1, it indicates that a digital TV closed caption service is provided, whereas when the "digital_cc" field is clear, it indicates that a NTSC line-21 closed caption service is provided. A "line21_field" field is exempt from the user, so it does not manner whether it is set as 1 or clear. A "caption_service_number" field is a 6-bit integer value within the range from 0 to 63 identifying a caption service number within the closed caption stream related to the character and attribute defined within a current repeated process in the 'for' loop. This field is defined only when the "digital_cc" field indicates the digital TV closed caption service. For example, if the "caption_service_number" field is 0, it indicates a primary caption service, and if the "caption_service_number" field is 1, it indicates a secondary caption service. An "easy_reader" field is a logic flag. When the "easy_reader" field is set as 1, it indicates that a closed caption service has been adjusted so as to be easily read according to the needs of a beginner. If this field is clear, it indicates that the closed caption service has not been adjusted. The "easy_reader" field does not have any meaning when the "digital_cc" field is clear. A "wide_aspect_ratio" field is a logic flag. When the "wide_aspect_ratio" field set as 1, it indicates that the closed caption service has been formatted to be displayed in a screen ratio of 16:9. When the "wide_aspect_ratio" field is clear, it indicates that the closed caption service has been formatted to be displayed in a screen ratio of 4:3. This field does not have any meaning if the "digital_cc" field is clear.

Although not shown, the caption service descriptor may additionally include a parameter (referred to as '3D caption-related information', hereinafter) for supporting a 3D caption. The 3D caption-related information may be, for example, horizontal disparity data to be used for determining a caption display position in an extended view based on a caption display position in a base view.

Figure 21:
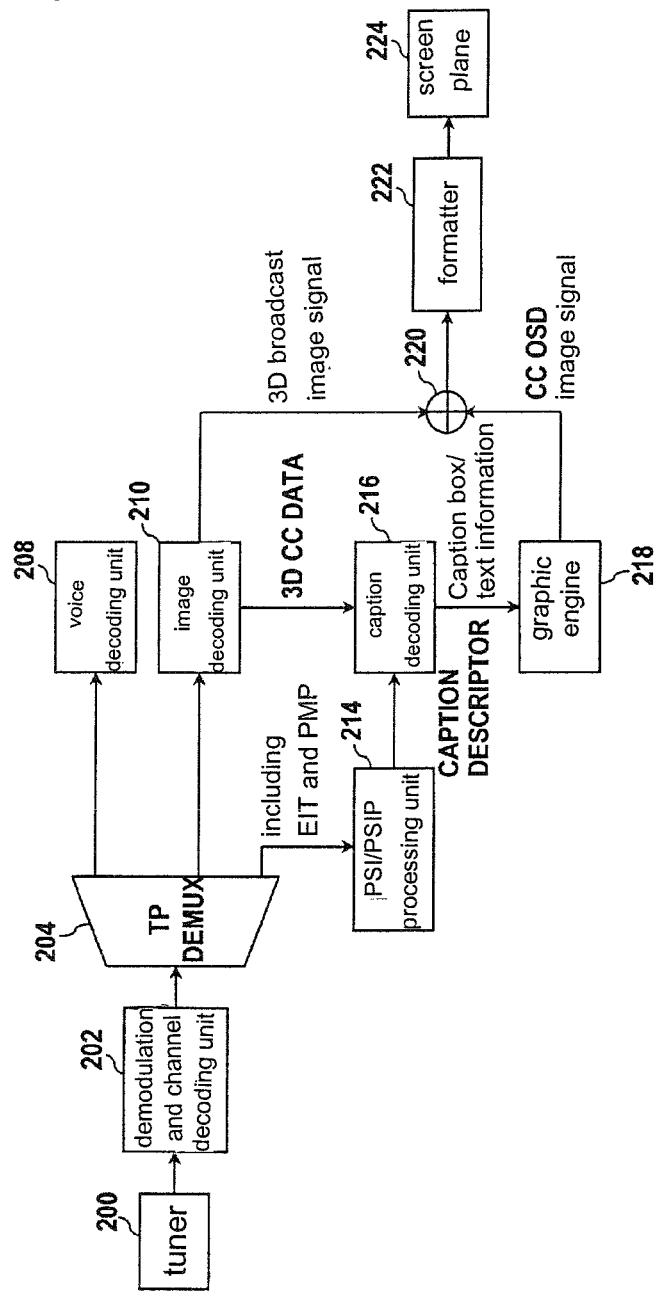
FIG. 21 is a schematic block diagram of a television receiver according to a second exemplary embodiment of the present invention.

FIG. 21 is a schematic block diagram of a television receiver according to an exemplary embodiment of the present invention. The television receiver according to the present exemplary embodiment is adaptive to receive a skywave broadcast signal to reproduce an image.

A tuner 200 selects a broadcast signal of a certain channel selected by the user from among a plurality of broadcast signals inputted via an antenna (not shown), and outputs it. A demodulation and channel decoding unit 202 demodulates the broadcast signal from the tuner 200 and performs error-correction-decoding on the demodulated signal to output a transport stream (TS). A transport demultiplexing unit 204 demultiplexes the TS to separate a video ES and an audio ES, and extracts PSI/PSI P information.

A voice decoding unit 208 decodes the audio ES to output a digital audio bit stream. The audio bit stream is converted into an analog audio signal by a digital-analog converter (not shown), amplified by an amplifier (not shown), and then outputted via a speaker (not shown). An image decoding unit 210 parses the video ES to extract an extended/user data and an MPEG-2 video bit stream, and extracts the caption data cc_data( ) from the extended/user data and provides the extracted caption data cc_data( ) to the caption decoding unit 216. The image decoding unit 210 extracts closed caption data cc_data( ) from the extended/user data and provides the extracted caption data cc_data( ) to a caption decoding unit 216. The image decoding unit 210 decodes the MPEG-2 video bit stream to output left and right image signals for implementing a stereoscopic 3D image. The decoding process by the voice decoding unit 208 and the image decoding unit 210 may be performed based on a packet ID (PID) checked (or ascertained) by a PSI/PSI P processing unit 214.

The PSI/PSI P processing unit 214 receives the PSI/PSIP information from the transport demultiplexing unit 204, parses the received PSI/PSIP information, and stores the parsed information in a memory (not shown) or a register, to allow broadcast to be reproduced based on the stored information. Caption service information describing the type and attribute of a caption service is included in the form of a caption service descriptor in the EIT of the PSIP received by the receiver. The PSI/PSIP processing unit 214 extracts the caption service information to allow the caption decoding unit 216 to utilize it when decoding the caption data. However, in a modification, the caption service information may be utilized by the graphic engine 218, not by the caption decoding unit 216, or may be utilized by both the caption decoding unit 216 and the graphic engine 218.

The caption decoding unit 216 receives the caption service information from the PSI/PSIP processing unit 214 and also receives the caption data cc_data( ) from the image decoding unit 210. The caption decoding unit 216 releases the packets of the caption data cc_data( ) based on the caption service information from the PSI/PSIP processing unit 214 to restore the packet data, and restores service block data with respect to each service. And then, the caption decoding unit 216 decodes and interprets the service block data according to the code book based on the code space disposition in FIG. 16. In particular, according to an exemplary embodiment of the present invention, the caption decoding unit 216 decodes the Define Window Command, the Define 3D Box Command, the Set Window Attributes Command, the Set 3D Box Attributes Command, the Set Pen Color Command, and the Set 3D Pen Color Command, while sequentially decoding the service block data. The caption decoding unit 216 provides the decoded 3D caption box information and the caption text information to the graphic engine 218. In a modification, the caption decoding unit 216 may provide the entirety of a portion of the parameters of the commands to the graphic engine 218, so that the graphic engine 218 can utilize them.

The graphic engine 218 receives the 3D caption box and the caption text information from the caption decoding unit 216, and performs 3D rendering based on the information to generate a caption bit map with respect to a base view and an extended view, in the form of an OSD signal. Here, the base view may be a left image and the extended view may be a right image. The 3D rendering operation may be implemented by using one of the existing 3D rendering scheme or a scheme that may be proposed in the future, or by mixedly using those schemes. The 3D rendering operation can be easily implemented by the person in the art to which the present invention pertains, base on the description of the present invention, so its detailed description will be omitted.

The mixer 220 mixes left and right closed caption OSD image signals transferred from the graphic engine 218 to left and right broadcast image signals transferred from the image decoding unit 210. The formatter 222, comparing a frame time with the caption bit map-overlapping left and right image signals, formats temporally consistent left and right images such that they are displayed as pairs. Accordingly, the 3D closed caption is restored and outputted to the formatted 3D image on the screen plane 224.

Figure 22:
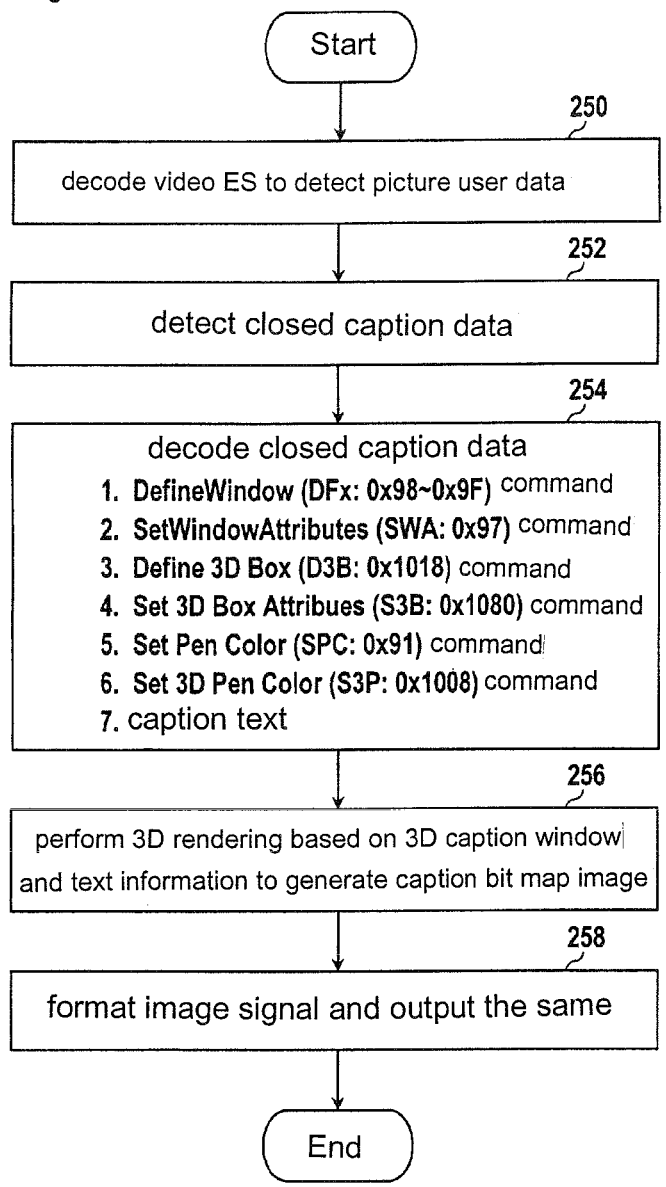
FIG. 22 is a flow chart illustrating the process of extracting closed caption information and displaying a 3D closed caption in the television receiver illustrated in FIG. 21.

The process of extracting closed caption information in the television receiver illustrated in FIG. 21, and displaying the 3D closed caption will now be described with reference to FIG. 22.

First, the PSI/PSIP processing unit 214 parses a PSIP to extract a master guide table (MGT) ("PID"='0x1FFB', "table_ID"='0xC7') based on a packet ID (PID) and a table ID, and acquires PID information regarding an event information table (EIT) from the MGT. Next, the PSI/PSIP processing unit 214 reads a TP having the acquired PID to extract an EIT ("table_ID"='0xC7'). And then, the PSI/PSIP processing unit 214 parses the EIT to detect a caption service descriptor as illustrated in FIG. 20 with respect to each event in the EIT.

Subsequently, the image decoding unit 210 parses the video ES to extract a header and the extended/user data, and decodes extension_and_user_data(2) within the picture header to extract picture user data user_data( )(S250). Meanwhile, in a modification in which the video ES is coded according to the H.264/AVC standard, a supplemental enhancement information (SEI) region is decoded. Namely, the image decoding unit 210 parses an AVC NAL unit to extract SEI data having a "nal_unit_type" value of '6', and reads a user_data_registered_itu_t_t35( ) having a "payloadType" value of '4'.

Thereafter, the image decoding unit 210 detects ATSC_user_data( ) having the "user_data_identifier" value of '0x4741 3934' from the picture user data user_data( ).

Subsequently, the image decoding unit 210 detects ATSC_user_data( ) having a "user_data_identifier" value of '0x4741 3934' from the picture user data user_data( ). Thereafter, the image decoding unit 210 extracts user_data_type_structure( ) having "user_data_type_code" of '0x04' from the ATSC_user_data( ). And then, the image coding unit 210 extracts cc_data( ) from the use_data_type_structure( ) and provides a pair of bytes (cc_data1 and cc_data2) of the caption data received through cc_data( ) to the caption decoding unit 216 (S252).

The caption decoding unit 216, accumulating the pair of bytes of the caption data received through cc_data( ) decodes and interprets the caption data based on the caption service information transferred from the PSI/PSIP processing unit 214. In particular, according to an exemplary embodiment of the present invention, the caption decoding unit 216 decodes the Define Window Command, the Define 3D Box Command, the Set Window Attributes Command, the Set 3D Box Attributes Command, the Set Pen Color Command, and the Set 3D Pen Color Command, while sequentially decoding the service block data (S254).

The graphic engine 418 receives the 3D caption box and the caption text information from the caption decoding unit 216, and performs 3D rendering based on the information to generate a caption bit map image with respect to a base view and an extended view (S256). The generated caption bit map image is mixed with a broadcast image signal, formatted, and then outputted (S258).

The invention being thus described, it will be obvious that the same may be varied in many ways. Although certain embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments, but are defined by the claims, which follow, along with their full scope of equivalents.

INDUSTRIAL APPLICABILITY

As so far described, in a television receiver, a closed caption can be displayed with a cubic effect such that it is in harmony with a 3D image without heavily increasing the burden of calculation required for 3D rendering. Accordingly, the utility and charm of the closed caption can be considerably increased. In addition, because an existing caption signal transmission/reception method is implemented by supplementarily including a parameter, the compatibility with the existing standard can be secured.

The present invention can be applicable to any display device that has a 3D image display capability and needs to have a closed caption display function. In particular, the present invention can be particularly useful for a stereoscopic display device regardless of a formatting type, such as a dual-mode display, a time sequence-mode display, or the like.

The invention claimed is:
1. A method for transmitting a three dimensional (3D) caption signal, the method comprising:
preparing a 3D image signal for displaying a 3D image;
generating 3D caption data based on a code space, wherein the 3D caption data includes 3D caption information and caption text, wherein the caption data is formatted within picture user data, and wherein the picture user data is inserted at any of Sequence level, Group of Pictures (GOP) level, and Picture Data level; and inserting the 3D caption information and the caption text into a video picture header region to code the image signal, and transmitting the same, such that a caption image including 3D caption text disposed in a 3D caption box is generated based on the 3D caption information and the caption text in a 3D display device, wherein the code space contains base code sets and extended code sets, and wherein the 3D caption information is delivered in at least one extended code set and the at least one extended code set is accessed by using an 'EXT1' code in a base code set, such that a caption image including 3D caption text disposed in a 3D caption box is generated based on the 3D caption information and the caption text in a 3D display device.

2. The method of claim 1, wherein, in generating the 3D caption information and the caption text, 3D text configuration information is additionally generated, the 3D caption information and the 3D text configuration information are inserted into the video picture header region to decode the image signal, and the decoded image signal is then transmitted.

3. The method of claim 1, wherein the 3D caption information is generated together with 2D window configuration information, and coded.

4. The method of claim 3, wherein the 3D caption information comprises 2D window defining information, 3D text box configuration information supplementing the 2D window defining information, 2D window attribute configuration information, and 3D text box attribute configuration information supplementing the 2D window attribute configuration information.

5. The method of claim 1, wherein the 3D caption information is inserted into a picture header region of the broadcast signal.

6. A method for displaying a three-dimensional (3D) caption in a 3D display device, the method comprising:

receiving a broadcast signal including 3D image signal and 3D caption data based on a code space, wherein the caption data is formatted within picture user data, and wherein the picture user data is inserted at any of Sequence level, Group of Pictures (GOP) level, and Picture Data level;

acquiring 3D caption information and caption text from the 3D caption data; and generating a caption image including 3D caption text disposed in a 3D caption box based on the 3D caption information and the caption text, and displaying the same, wherein the code space contains base code sets and extended code sets, and wherein the 3D caption information is delivered in at least one extended code set, wherein the at least one extended code set is accessed by using an 'EXT1' code in a base code set.

7. The method of claim 6, wherein, in displaying the caption image, the caption image is mixed with a 3D broadcast image, formatted, and then displayed.

8. The method of claim 6, wherein, in acquiring the 3D caption information and the caption text, 3D text configuration information is additionally received, and the caption image is generated based on the 3D caption information, the 3D text configuration information, and the caption text.

9. The method of claim 6, wherein, in acquiring the 3D caption information and the caption text, the 3D caption information is received along with the 2D window configuration information.

10. The method of claim 9, wherein the 3D caption information comprises 2D window defining information, 3D text box configuration information supplementing the 2D window defining information, 2D window attribute configuration information, and 3D text box attribute configuration information supplementing the 2D window attribute configuration information.

11. The method of claim 6, wherein the 3D caption information is extracted from a picture header region of the broadcast signal.

* * * * *